US007994990B2

(12) United States Patent
Stoufer et al.

(10) Patent No.: US 7,994,990 B2
(45) Date of Patent: Aug. 9, 2011

(54) SIMULATOR FOR INTERNAL ANTENNAS IN TELEMETRY DEVICES

(75) Inventors: Paul Stoufer, Brandon, MS (US); Henry Lee Jones, II, Jackson, MS (US)

(73) Assignee: SmartSynch, Inc., Jackson, MI (US)

( * ) Notice: Subject to any disclaimer, the term of this patent is extended or adjusted under 35 U.S.C. 154(b) by 348 days.

(21) Appl. No.: 12/138,070

(22) Filed: Jun. 12, 2008

(65) Prior Publication Data

US 2008/0316087 A1     Dec. 25, 2008

Related U.S. Application Data

(60) Provisional application No. 60/944,946, filed on Jun. 19, 2007.

(51) Int. Cl.
*G01R 29/08* (2006.01)

(52) U.S. Cl. ........................................ 343/703

(58) Field of Classification Search .............. 343/702, 343/703, 719, 872, 873
See application file for complete search history.

(56) References Cited

U.S. PATENT DOCUMENTS

| | | | |
|---|---|---|---|
| 4,794,396 A * | 12/1988 | Pothier | 343/703 |
| 6,469,673 B2 | 10/2002 | Kaiponen | |
| 6,657,214 B1 | 12/2003 | Foegelle et al. | |
| 6,839,032 B2 | 1/2005 | Teshirogi et al. | |
| 6,885,348 B1 | 4/2005 | Ryken, Jr. et al. | |
| 6,943,739 B1 | 9/2005 | Rousu et al. | |
| 6,946,972 B2 | 9/2005 | Mueller et al. | |
| 7,109,932 B2 | 9/2006 | Kadambi et al. | |
| 7,129,900 B2 | 10/2006 | De Angelis | |
| 2001/0007444 A1 | 7/2001 | Porter et al. | |
| 2006/0017630 A1 | 1/2006 | Kildal | |

* cited by examiner

Primary Examiner — Michael C Wimer
(74) Attorney, Agent, or Firm — Morris Manning Martin LLP; John R. Harris, Esq.; Daniel E. Sineway, Esq.

(57) ABSTRACT

Systems and methods are described for simulating an internal antenna within a telemetry device. The simulator device includes a housing having at least one opening, wherein the housing is configured to accommodate close proximity placement of the telemetry device. The simulator device also includes a simulator or test antenna within the housing that corresponds to an internal antenna within a housing of the telemetry device. The simulator device further includes a radio frequency (RF) connector coupled to the simulator housing, for connection to a communication device. The simulator device also includes a fastening mechanism to secure the simulator device over the telemetry device so that the simulator antenna is adjacent to the internal antenna. The proximity of the simulator antenna to the internal antenna provides simulator device RF characteristics that simulate internal antenna RF characteristics.

28 Claims, 12 Drawing Sheets

SIMULATOR FOR INTERNAL ANTENNAS IN TELEMETRY DEVICES

CROSS-REFERENCE TO RELATED APPLICATIONS

This application claims the benefit under 35 U.S.C. §119 (e) of U.S. Provisional Patent Application Ser. No. 60/944,946, entitled "Simulator for Internal Antennas in Telemetry Devices," filed Jun. 19, 2007, which is incorporated herein by reference as if set forth herein in its entirety.

TECHNICAL FIELD

This invention relates in general to wireless communications of telemetry devices. More particularly, this invention relates to devices and methods for the simulation of an antenna inside of a telemetry device.

BACKGROUND

With the growth of the wireless industry, more and more services are being added which may use the existing wireless networks to transmit data to a remote location. Telemetry is often used to allow remote reporting of measurements and other data of interest. Typically, wireless communications, such as a radio system, are utilized to implement a data link between the remote device and a host or data collection system. Of course, data links can also use telephones, computer networks, or optical links, for example. Telemetry is particularly useful in those situations where multiple resources are distributed over wide areas.

Telemetry applications utilizing an existing wireless network for remotely transmitting measured data have been proposed. Specifically, U.S. Pat. No. 6,946,972 describes a method for wirelessly transmitting data from a utility meter, such as an electric meter. U.S. Pat. No. 7,129,900 discloses an antenna arrangement for a conventional utility meter having radio frequency (RF) communication capability. U.S. Patent Application Publication No. 2001/0007444 suggests an antenna for use with an electric meter chassis to communicate wirelessly, and a method for manufacturing the same.

Wireless communication devices for telemetry applications often utilize antennas that are located within the product enclosure, which might be sealed for environmental or certification reasons. The wireless communication devices are typically developed in a laboratory and then deployed in the field. In most cases, the performance of the device is dependent on the particular performance of the antenna. Yet, because the antenna is internal to the product, simulation of performance of the internal antenna can only be performed by utilizing a communication device that is located outside the device.

One alternative technique is the use of a small "whip" antenna or other similar external antenna for the purposes described above. However, this antenna type and its position away from the device may not satisfactorily mimic the performance of the internal antenna to the fidelity required by the design, development, or installation team.

U.S. Pat. No. 6,469,673 describes a method for assembling and testing a radio device. The antenna to be tested is decoupled from the RF electronics, and then the RF electronics is aligned. After the alignment, the antenna is coupled to the RF electronics and then tested advantageously with a coupler.

U.S. Pat. No. 6,657,214 discloses a shielded test system providing a common air interface for testing transmit and receive functionality of wireless communication devices. The device to be tested is placed in a test chamber of an RF-shielded enclosure. The test chamber is equipped with a novel test antenna structure for wirelessly communicating test signals to a device under test.

U.S. Pat. No. 6,839,032 discloses a portable radio terminal testing apparatus comprising an antenna coupler, connecting means, and a measuring device, wherein the coupler comprises a placement member, which places a testing object, a coupling antenna, electromagnetically coupled to an antenna of the testing object.

U.S. Pat. No. 6,885,348 discloses a test chamber for testing a frequency response of a low band antenna array output. The test chamber comprises a rectangular shaped steel enclosure having a lid and a microwave absorptive foam is affixed to the interior walls and base of the enclosure. The lid for the enclosure includes an opening and a pair of alignment pins for positioning the array's monopole antennas within the interior of the test chamber. A probe is located in one corner of the test chamber to provide the RF test signal to the array's monopole antennas.

U.S. Pat. No. 6,943,739 discloses a device for testing RF circuits located in wireless devices in a manner that does not require removal of the module housing or the antenna. U.S. Pat. No. 7,109,932 suggests an antenna test cavity to test the efficiency of an antenna. U.S. Patent Application Publication No. 20060017630 discloses an apparatus and a method for measuring the receiver sensitivity of mobile and wireless terminals.

However, prior test environments and methods for testing wireless devices suffer from a number of shortcomings. In, particular, the aforementioned conventional systems/methods do not simulate an antenna inside of a telemetry device capable of RF communication, to determine the RF performance of the device. In addition, the conventional systems do not suggest any technique for the determination of the communication signal strength, signal quality, or network details to and from the available network infrastructure to determine whether the telemetry device functions well at a given endpoint location. Also, the antenna type and its position away from the device, in conventional systems, may not satisfactorily mimic the performance of the internal antenna to the fidelity required by the design, development, or installation team.

SUMMARY

Briefly described, and according to one embodiment, the present invention is directed towards systems and methods for simulating an internal antenna within a telemetry device. In particular a simulator device is provided for simulating an internal antenna of a telemetry device. The simulator device includes a housing having at least one opening, wherein the housing is configured to accommodate close proximity placement of the telemetry device. The simulator device also includes a simulator or test antenna within the housing that corresponds to an internal antenna within a housing of the telemetry device. The simulator device further includes a radio frequency (RF) connector coupled to the simulator housing, for connection to a communication device. The simulator device also includes a fastening mechanism to secure the simulator device over the telemetry device so that the simulator antenna is adjacent to the internal antenna. The proximity of the simulator antenna to the internal antenna provides simulator device RF characteristics that simulate internal antenna RF characteristics.

In another aspect of the simulator device, the RF connector is capable of connection to deployment devices.

In another aspect of the simulator device, the RF connector is capable of connection to diagnostic devices.

In another aspect of the simulator device, the RF connector is capable of connection to a coverage validation unit (CVU).

In another aspect of the simulator device, the RF connector is separate from the simulator device and is connected via a cable.

In another aspect of the simulator device, the telemetry device is a utility meter.

In another aspect of the simulator device, the simulator or test antenna is identical to the internal antenna of the telemetry device.

In another aspect of the simulator device, the simulator housing is comprised of the same material as the housing of the telemetry device.

In another aspect of the simulator device, the simulator housing has a top side and an open base, wherein the housing is configured to receive the telemetry device through the open base.

In another aspect of the simulator device, the simulator housing has a shape that corresponds to the housing of the telemetry device.

In another aspect of the simulator device, the simulator housing has a shape that corresponds to a semicircle.

In another aspect of the simulator device, the simulator fits over the telemetry device so that the simulator antenna is oriented in the same manner as the telemetry device internal antenna.

In another aspect of the simulator device, the fastening mechanism is a slit in the simulator housing, oriented so that the simulator device is secured to the telemetry device via a spring action.

In another aspect of the simulator device, the fastening mechanism is a hook-and-loop strap.

In another aspect of the simulator device, the fastening mechanism is an elastic band.

In another aspect of the simulator device, the fastening mechanism is an adhesive material or substance.

In another aspect of the simulator device, the fastening mechanism utilizes magnetic fields.

In another aspect of the simulator device, an inner-diameter lip on the top side of the housing is oriented to facilitate placement of the simulator housing over the telemetry housing.

In another aspect of the simulator device, the simulator antenna is positioned on an inside face of the simulator housing.

In another aspect of the simulator device, the simulator housing is cylindrical in shape.

In another aspect of the simulator device, the simulator antenna has a curvature similar to the simulator housing.

In another aspect of the simulator device, the simulator housing is rectangular in shape.

In another aspect of the simulator device, the simulator housing is shaped to correspond to a plurality of telemetry devices, and at least two telemetry devices from the plurality have telemetry housings of differing shape.

In another aspect of the simulator device, the simulator housing has a plastic body.

In another embodiment of the present invention, a method is provided for simulating the internal antenna of a telemetry device, comprising embedding a test antenna within a simulator; securing the simulator over the telemetry device, wherein the test antenna is oriented in a manner corresponding to the internal antenna; connecting the simulator to a communication device; and retrieving RF characteristics from the simulator through the communications device, wherein the retrieved RF characteristics are a simulation of internal antenna RF characteristics.

In another aspect of the simulation method, the communication device is coupled to a diagnostic device.

In another aspect of the simulation method, the communication device is coupled to a deployment device.

It is a further object of the present invention to provide a simulator to determine the sensitivity pattern for a telemetry device.

Still another object of the present invention is to provide a simulator to determine whether an external antenna is required for the installation of a telemetry device.

It is still a further object of the present invention to provide a simulator to test the impact of the internal antenna on existing products or products under development using an external communications source that may have more debugging capability than an internal source.

Yet another object of the present invention is to provide a simulator to assess the impact of the existence and actions of other components of a telemetry device on the performance of an antenna during design and development.

An additional object of the present invention is to provide a simulator to allow designers and developers to more easily determine the impact on other radios that might be in or near the device.

Yet another object of the present invention, is to provide a simulator, wherein the device typically does not include any positioning feature that physically conflicts with the features of the widest variety of utility meter models.

Still another object of the present invention is to provide a simulator, which can accommodate multiple utility meter diameters.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
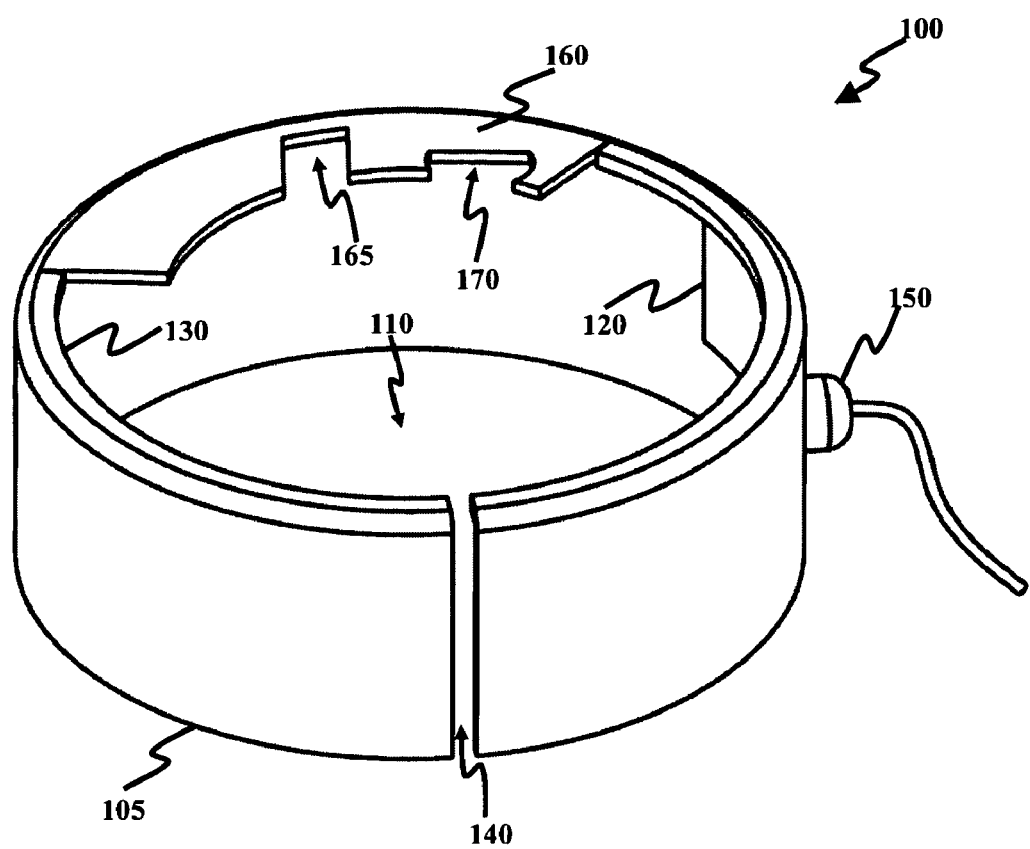
FIG. 1 is an isometric top view of an exemplary simulator in accordance with the present invention.

Reference is now made in detail to the description of the embodiments of systems and methods for simulation of an antenna inside a telemetry device as illustrated in the drawings. The inventions may, however, be embodied in many different forms and should not be construed as limited to the embodiments set forth herein; rather, these embodiments are intended to convey the scope of the inventions to those skilled in the art. Furthermore, all "examples" given herein are intended to be non-limiting.

In one preferred embodiment, an exemplary simulator is a featured device of a coverage validation unit (CVU) for verifying GPRS, CDMA or Wi-Fi frequency coverage prior to deployment of intelligent meters, such as for example, SmartMeters™ developed by SmartSynch, Inc. The CVU is a handheld device, also developed by SmartSynch, Inc., that enables utility technicians to verify performance and frequency coverage in the field. (Technicians were previously required to place meters in the field and then return to their offices to measure performance; such trial-and-error approaches often required multiple trips for relocation of the meters.) The CVU features an antenna simulator—as described herein—together with a quad-band GPRS module, and provides the information to ensure proper network communication at each meter location.

Additionally, Global Positioning System (GPS) coordinates can be calculated by the CVU and automatically transmitted together with the coverage data from the simulator to a configuration server for storage and analysis. The CVU, utilizing the functionality of the simulator, enables RF coverage analysis, meter deployment mapping via GPS, tracking of installation configuration, and network coverage troubleshooting. Site validation of frequency coverage prior to and during meter deployment provides higher deployment success and reduced costs.

Referring now to the drawings, FIG. 1 is an isometric view of an exemplary simulator 100 for testing or simulation of an antenna within a telemetry device. A typical simulator 100 is cylindrical in shape, though other geometries are well within the scope of the present inventions to accommodate the testing or simulation of internal antennas from a variety of telemetry devices. The typical simulator 100 comprises a housing 105 for receiving a telemetry device into a chamber 110. The chamber 110, is typically sized so that the desired telemetry device readily fits within the housing. Of course, the chamber 110 may be sized for a particular telemetry device, or alternatively may be designed to accommodate multiple telemetry devices having a variety of shapes and sizes. The simulator 100 is preferably shaped to fit over the front of the telemetry device body, though other shapes are readily apparent as will be understood by those skilled in the art.

In one embodiment, the housing 105 has a top side 160 that is shaped to correspond with the housing of the particular telemetry device undergoing testing. In some embodiments, the top side 160 has the shape of a notched semi-circle as shown in FIG. 1, and typically contains slots 165, 170 (or notches) for receiving the projections of a telemetry device, e.g., a utility meter. A portion of the top side 160 typically remains open so that the simulator 100 is not unduly restrained from accommodating telemetry devices having different shapes. The slots 165, 170 enable the simulator 100 to fit over the telemetry device while allowing for the projections that are typically a part of the device. Of course, telemetry devices may contain projections that differ from the notched semi-circle as shown in FIG. 1, and those of skill in the art will readily understand that top side 160 is not limited to the notched semi-circle shape as shown. It is well within the scope of the present inventions for the top side 160 to comprise other shapes having various size openings, a complete opening, or no opening at all, in order to accommodate a variety of telemetry devices having multiple projections or even no projections.

The housing 105 is typically placed over the telemetry device undergoing testing in a manner that allows for close proximity placement of the telemetry device to the simulator. In some embodiments, the housing 105 has a defined top side 160 and a defined base, while other embodiments are symmetrical so that a clearly defined base is not readily apparent. It should be noted that one objective of the housing 105 is to facilitate close proximity placement of the simulator device 100 to the telemetry device.

A simulator antenna 120 is located within the housing 105, and is typically positioned so as to simulate an internal antenna that is located within the telemetry device. The simulator antenna 120 is typically located on the inside face 130 of the housing 105 in a position corresponding to the location of the internal antenna within the telemetry device. Of course, one of skill in the art will readily understand that the simulator antenna 120 could be located near the top side 160 or near the base of the housing 105, or in any other appropriate location within the housing 105 that corresponds to the internal antenna location.

In a typical embodiment, the simulator antenna 120 is identical to the internal antenna of the telemetry device. The simulator 100 is placed over the telemetry device such that the telemetry device is within the housing 105, and the simulator 100 is oriented such that the simulator antenna 120 is placed as near as is practically possible to the internal antenna of the telemetry device.

In one embodiment, the simulator 100 is secured to the telemetry device via a split 140 in the housing 105. The split 140 allows for a springing action to keep the simulator 100 in place over a typical telemetry device. Preferably, the split 140 is located in the housing 105 opposite to the notched semi-circle. Thus, the slots 165, 170 for any projections from the telemetry device together with the springing action of the split 140 serve to secure the housing 105, and thus the simulator 100, to the telemetry device. Of course, those of skill in the art will readily understand that the split 140 is not limited to the location as shown in FIG. 1, and further that other mechanisms and devices can be implemented for securing the simulator 100 to the telemetry device.

In one embodiment, the housing 105 of the simulator 100 is manufactured from the same material as the telemetry device housing. Since the housing 105 is typically shaped to fit over the front of the telemetry device body, the simulator antenna 120 is located behind the same material as the telemetry device housing. Preferably, the simulator antenna 120 is also located as near as possible to the internal antenna of the telemetry device. Locating the simulator antenna 120 near the internal antenna and behind the same material gives the simulator radio frequency (RF) characteristics that are very close to the internal antenna of the telemetry device.

An RF connector 150 is typically provided on the housing 105 for connecting the simulator 100 through a cable to an external device such as deployment device or a diagnostic device. Of course, the simulator may also connect to other devices for determination of RF performance according to the specific simulation or test purposes. The ability to connect the same simulator 100 to deployment or diagnostic devices, for example, allows for the testing of antennas through a variety of communication combinations.

In an alternative embodiment, an RF connector 150 is not attached to the housing 105, but rather is connected to the simulator 100 via a cable.

The use of wireless telemetry devices typically requires verification that a location has sufficient wireless coverage to support the communication requirements of the devices. The simulator 100 of FIG. 1 provides physical and electrical characteristics that are similar to a particular telemetry device. The simulator 100 is typically placed on the telemetry device to be tested and provides a simulation of the antenna within the telemetry device. The simulation data is provided to external devices for analysis of frequency coverage. Wireless signals can be acquired and analyzed for determination of three typical wireless conditions. The location either (1) has wireless coverage sufficient to support the telemetry device, (2) requires an external antenna having higher sensitivity, or (3) cannot support a telemetry device. Of course, it will be readily understood by those of skill in the art that the coverage and simulation information can also be used for other types of analysis.

The simulator 100 is also useful during the development of telemetry devices. Simulation of an antenna is useful for determining the interference with the circuitry contained in the telemetry device. After placing the simulator 100 on a telemetry device, signals are injected into the telemetry device via the simulator 100 while monitoring the interference levels of the internal circuitry. Several parameters for the telemetry device can thus be determined, such as for example, ideal antenna position, shielding requirements, and antenna suitability for the desired function, among others.

Figure 2:
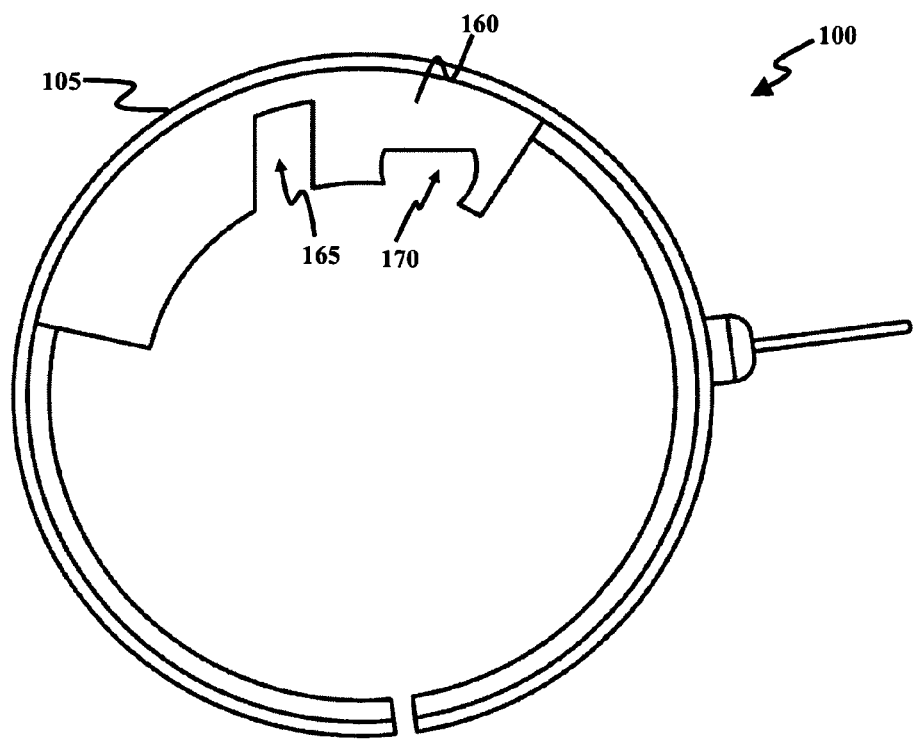
FIG. 2 illustrates a top view of the simulator according to FIG. 1.

FIG. 2 illustrates a top view of the simulator according to FIG. 1. It is noted that the top side 160 of the housing 105 of the simulator 100 has the shape of a notched semi-circle and includes slots 165, 170 for receiving the projections of a typical telemetry device such as a utility meter. As shown in FIG. 2, a portion of the top side 160 typically remains open allowing utilization of the simulator 100 with a variety of telemetry devices. As noted above, telemetry devices may comprise different shapes and different projections, and those of skill in the art will readily understand that the simulator may comprise differing shapes and also may include top sides of differing shapes. Indeed, the simulator may have openings of different sizes, may be completely open, or may have no opening at all, in accordance with the capability to accommodate a variety of telemetry devices having varying numbers of projections, or even no projections at all.

Figure 3:
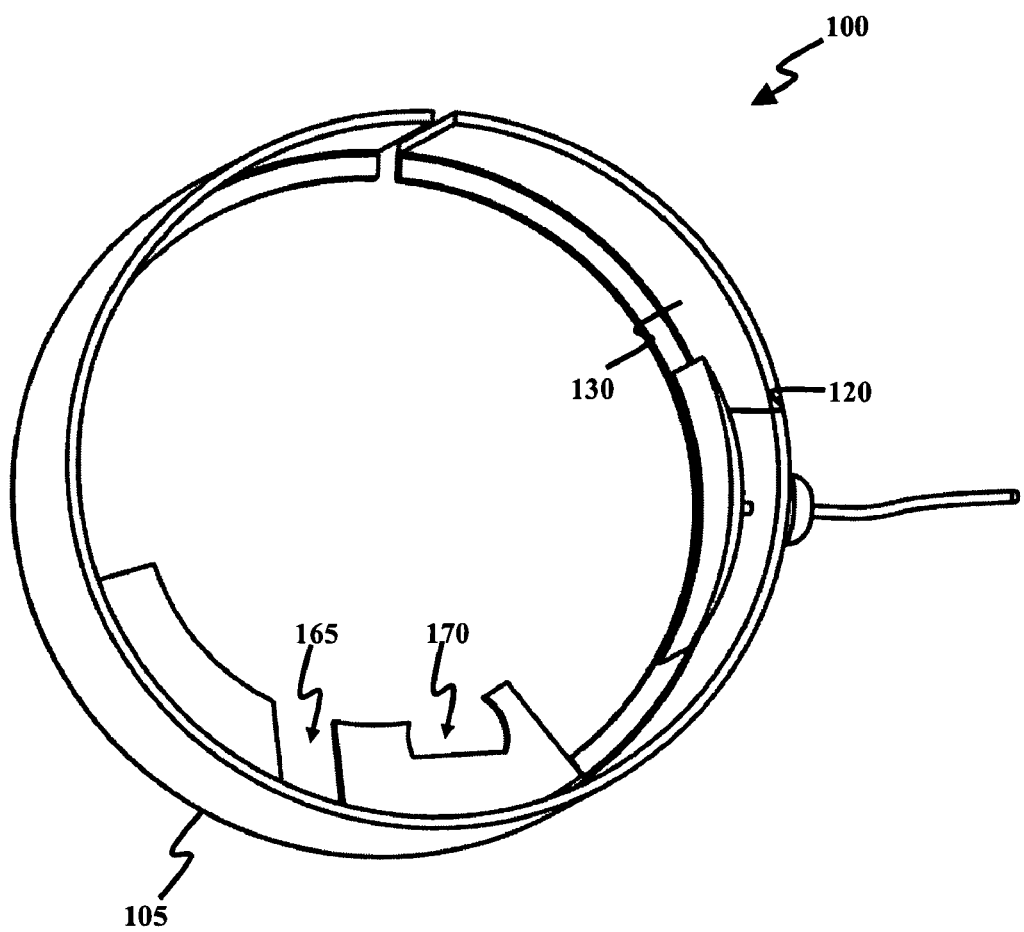
FIG. 3 illustrates an isometric bottom view of the simulator presented in FIG. 1.

FIG. 3 illustrates an isometric bottom view of the simulator 100. As is apparent, the simulator antenna 120 is located on the inside face 130 of the housing 105. The simulator antenna 120 has a curvature that is similar to the curvature of the housing 105. The simulator antenna 120 is typically located to be as near as possible to the internal antenna of the telemetry device undergoing testing or simulation.

Since the housing 105 of the simulator 100 is typically shaped to correspond to the front of the telemetry device, the curvature of the simulator antenna 120 is similar to the curvature of the housing 105 and allows for positioning the simulator antenna 120 very close to the production positions of the internal antenna of the telemetry device. Of course, the housing 105 can be shaped to correspond to telemetry devices of any shape, thus enabling positioning of the simulator antenna 120 as near as possible to the production position of the telemetry device internal antenna.

Figure 4:
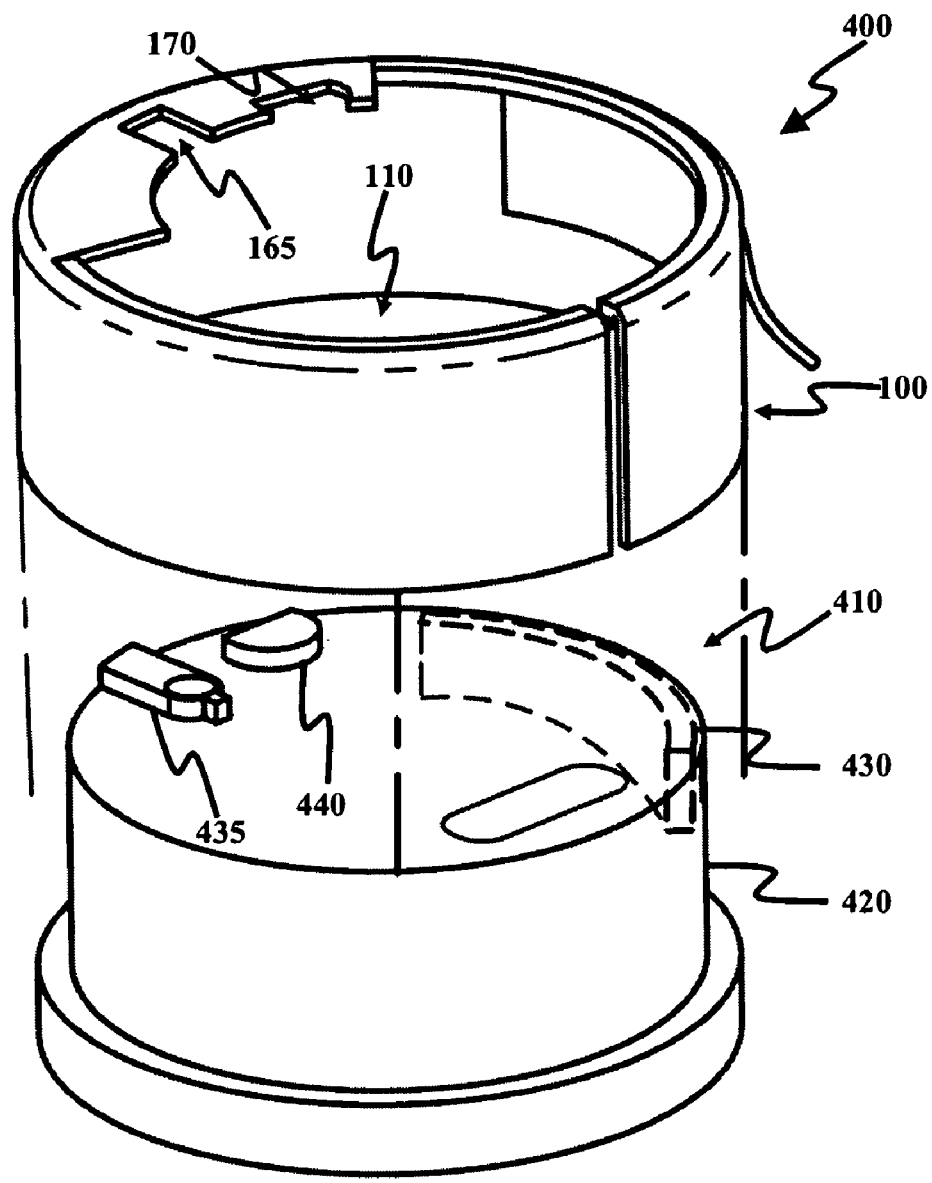
FIG. 4 illustrates an exploded view of an assembly of the simulator of FIG. 1 over a utility meter according to another embodiment of the present invention.

FIG. 4 illustrates an exploded view of an assembly 400 of a simulator 100 over a utility meter 410. Exemplary utility meters 410 include, but are not limited to, a SmartSynch GPRS SmartMeter. The simulator 100 is typically manufactured using the same material as the utility meter housing 420. The simulator 100 is of cylindrical shape with a height of approximately 2 inches and a diameter corresponding to the diameter of the front of the utility meter 410.

The chamber 110 of the simulator 100 receives a utility meter 410 that is capable of RF communication. The utility meter housing 420 encloses the necessary electronics for measuring and transmitting data using an available RF network. An antenna 430 is located within the utility meter housing 420, and allows for wireless communication by the electronics of the utility meter 410.

It should be noted also that the utility meter projections 435, 440 correspond to the slots 165, 170 of the simulator 100. Of course, other utility meters may include more or less projections, and the top side of the simulator may include corresponding slots to accommodate the projections.

Figure 5:
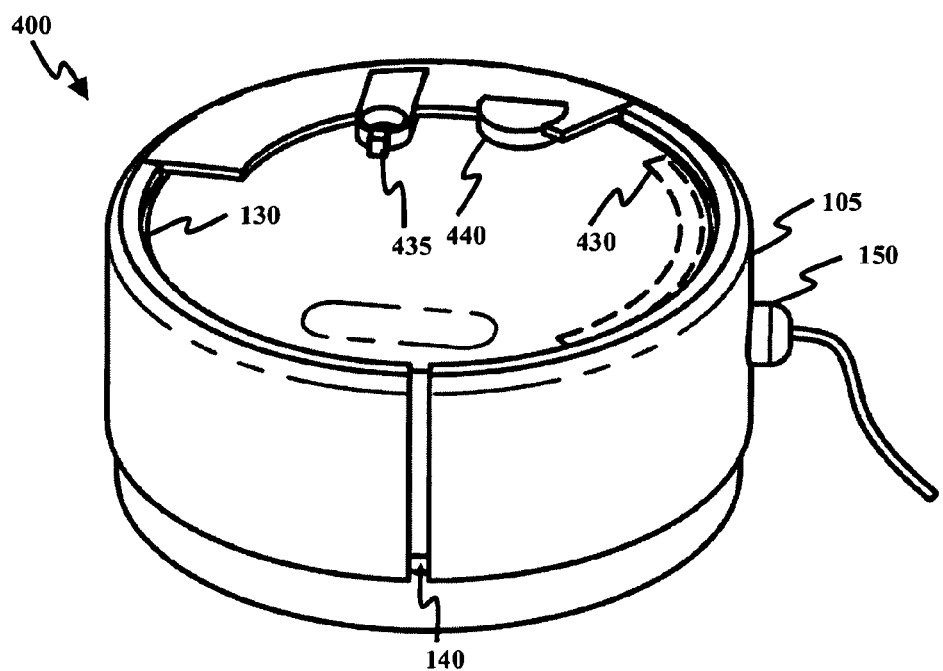
FIG. 5 illustrates an isometric view of the assembly of FIG. 4 showing the simulator installed over a utility meter.

FIG. 5 illustrates an isometric view of the assembly 400 with the simulator 100 installed over the utility meter 410. Again, it should be noted that the simulator 100 is not limited to a particular utility meter, but rather can be utilized for multiple utility meters (having multiple designs and configurations) and also for multiple other telemetry devices (also capable of multiple designs and configurations). The embodiment of FIG. 5 shows a simulator 100 installed over the utility meter 410 such that the simulator antenna 120 is of the same orientation as the antenna 430 within the housing 420 of the utility meter 410.

The projections 435, 440 of the utility meter 410 fit within the slots 165, 170 (positioning features) of the simulator 100. The positioning features provide an aid to the user in the effective installation and utilization of the simulator 100, and allow for consistently and reliably positioning the simulator 100 such that the simulator antenna 120 is as near as possible to the antenna 430 within the utility meter 410 (or other telemetry device). Of course, the projections 435, 440 may vary between respective utility meters 410 or other telemetry devices and thus, the positioning features of the simulator 100 may vary correspondingly. The positioning features are typically specific to a particular make and model of an end product, such as the utility meter 410, but alternatively can also be generic enough to effectively accommodate a range of makes and models.

As is also shown in FIG. 5, the split 140 provides a springing function and secures the simulator 100 firmly to the utility meter 410. Firmly securing the simulator 100 to the utility meter 410 helps ensure that the simulator antenna 120 is as near as possible to the antenna 430 within the utility meter 410, thus enabling the simulator 100 to simulate the antenna 430 in conditions that are very close to those experienced by the antenna 430 under test.

The RF connector 150 connects the simulator antenna 120 via cable to a deployment or diagnostic device, such as a CVU for example. As described above, a CVU enables the verification of the frequency coverage necessary for a meter—or other device—to function as desired. The CVU displays the wireless network coverage, thus enabling a user to identify whether a location is suitable for installation of utility meters having RF communication capability.

Figure 6:
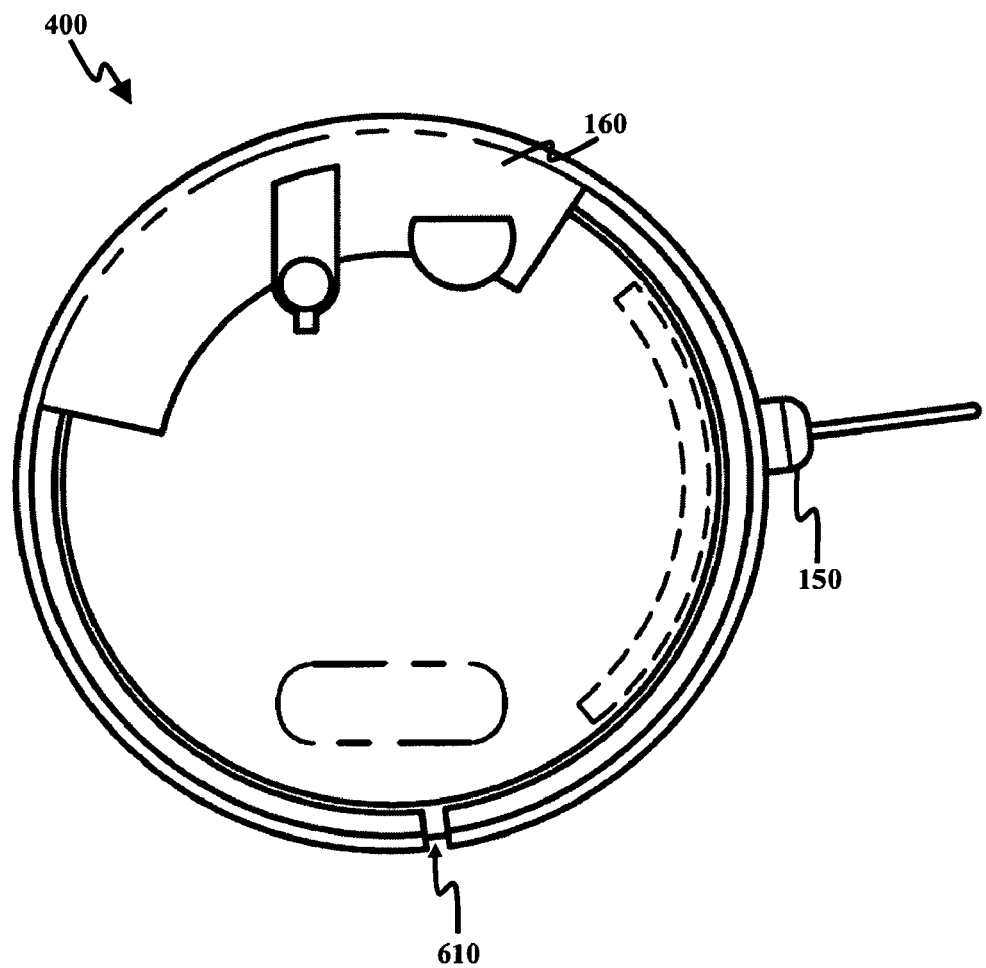
FIG. 6 illustrates a top view of the assembly of FIG. 4 showing the simulator installed over a utility meter.

FIG. 6 illustrates a top view of the assembly 400 with the simulator 100 installed over the utility meter. The typically semi-circular shape of the top side 160 of the simulator 100 is clearly evident for allowing a variety of different utility meter antennas (and other telemetry device antennas) to be connected to deployment or diagnostic devices using the same simulator 100. It is evident that the simulator 100 provides for use with a variety of meter/communication combinations. As noted above, the RF connector 150 enables connection of the simulator 100 to deployment or diagnostic devices (e.g., a CVU) via a cable. Again, the simulator 100 allows for connecting different simulator antennas 120 to the deployment or diagnostic devices, thus allowing the same simulator 100 to be used with multiple communication combinations.

A detailed discussion of the CVU is not presented here. However, in one embodiment, an important capability of the simulator 100 is to provide signals to the CVU so that the CVU may process the received signals and display network connectivity information. Using the displayed network connectivity information, the user can determine whether the connectivity is adequate for the installation of a utility meter having RF communication capability, whether an external antenna is required for use with the utility meter, or if a location is not suitable for the utility meter.

In another embodiment, the simulator 100 includes a small inner-diameter lip 610 on the front of the simulator 100. The lip 610 is useful in proper placement over the utility meter 410 and also restricts movement of the simulator 100 along the longitudinal axis of the utility meter 410.

In some embodiments, the simulator 100 does not include positioning features that physically conflict with the projections or features corresponding to a wide variety of utility meter models or of other telemetry devices. Reducing the amount of positioning features typically increases the number and variety of utility meter models of a given size with which the simulator 100 can be utilized.

Figure 7:
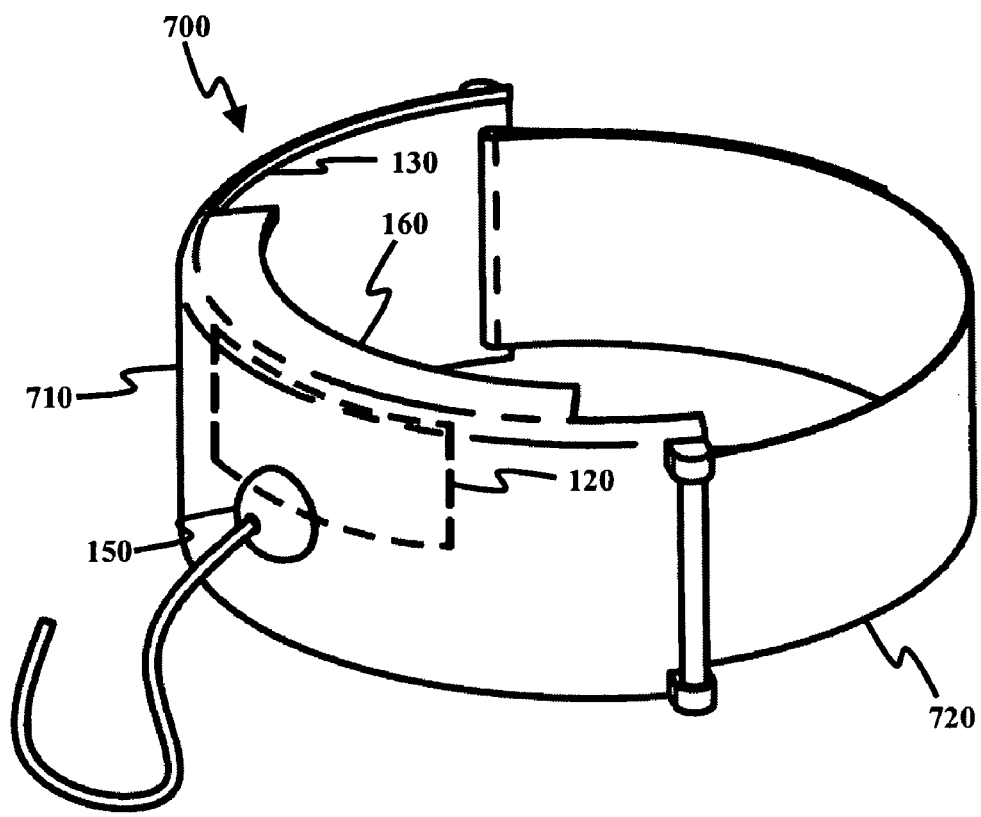
FIG. 7 illustrates an alternative embodiment of a simulator having a restraining strap.

FIG. 7 illustrates an isometric top view of an additional embodiment of the simulator 700 that includes a restraining strap 720. The simulator 700 is typically a half-circle shaped body 710 together with a restraining strap 720. The half-circle shaped body 710 is typically manufactured from plastic suitable for a simulator device, but can alternatively be manufactured from other appropriate materials such as rubber, metal or fiberglass. The restraining strap 720 secures the simulator 700 firmly to a utility meter 410 or other telemetry device. Of course, the restraining strap 720 can alternatively be replaced by fastening mechanisms such as an elastic band, a hook-and-loop strap, adhesive materials or substances, magnetic or electromagnetic devices, or other means readily apparent to those of skill in the art.

The simulator antenna 120 is located on the inside face 130 of the plastic body 710 of the simulator 700. The RF connector 150 connects the simulator via a cable to a deployment or diagnostic device, such as a CVU. The top side 160 of the simulator 700 is substantially open such that the covering does not present physical constraints for utilizing the simulator 700 with a variety of utility meter models or other telemetry devices. The simulator 700 typically does not include positioning features that would interfere with the capability to utilize the simulator 700 on a wide variety of utility meters of a given size. Of course, the simulator 700 is also suitable for use with other telemetry devices.

Other designs for the top side 160 may also be utilized to allow the simulator 700 to accommodate a variety of utility meters and are well within the scope of the present inventions.

Figure 8:
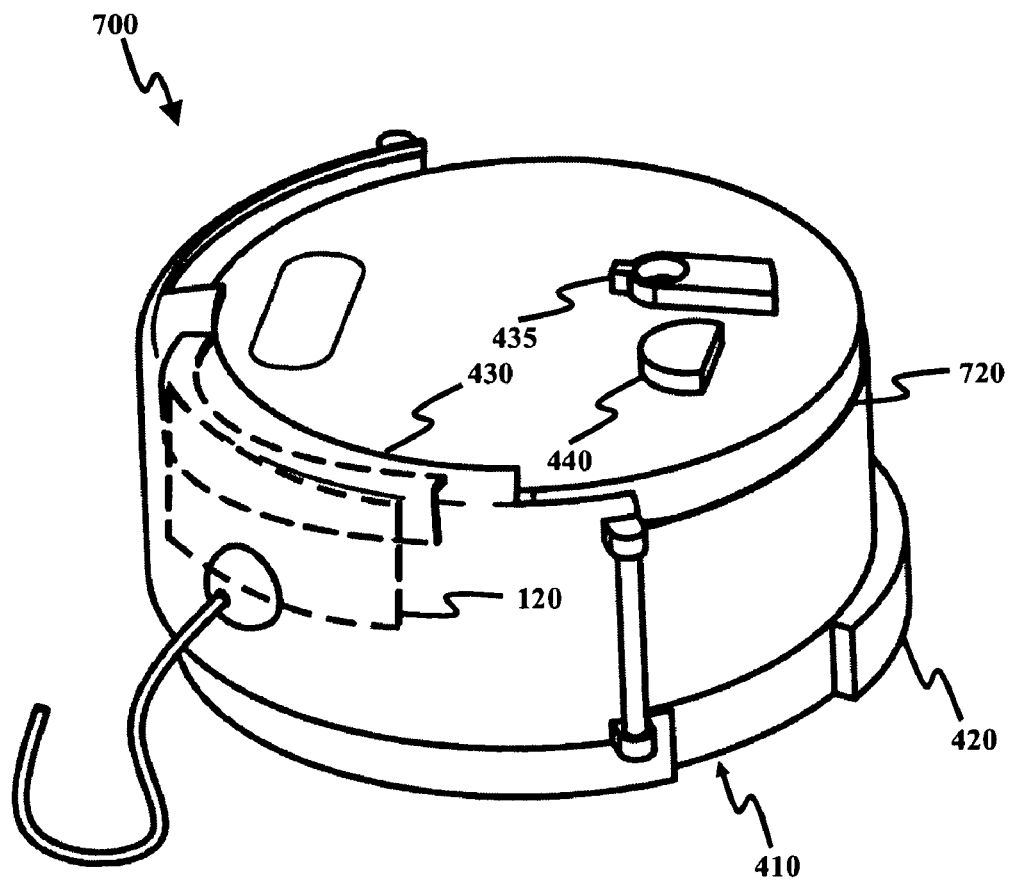
FIG. 8 illustrates an assembly of the simulator of FIG. 7 over a utility meter.

FIG. 8 illustrates an assembly of the simulator 700 over a utility meter 410. The simulator 700 receives a utility meter 410 that is capable of RF communication. The utility meter housing 420 encloses the necessary electronics for measuring and transmitting data using an available RF network. An antenna 430 is located within the utility meter housing 420, and allows for wireless communication by the electronics of the utility meter 410.

It should be noted that the simulator 700 is not limited to a particular utility meter, but rather can be utilized for multiple utility meters and also for multiple other telemetry devices. The simulator 700 is capable of accepting utility meters and telemetry devices having multiple designs and configurations. The simulator 700 is installed over the utility meter 410 such that the simulator antenna 120 is of the same orientation as the antenna 430 within the housing 420 of the utility meter 410.

The simulator 700 is secured firmly to the utility meter housing 420 via the restraining strap 720, so that the simulator antenna 120 is positioned as close as practically possible to the internal antenna 430 of the utility meter 410.

Figure 9:
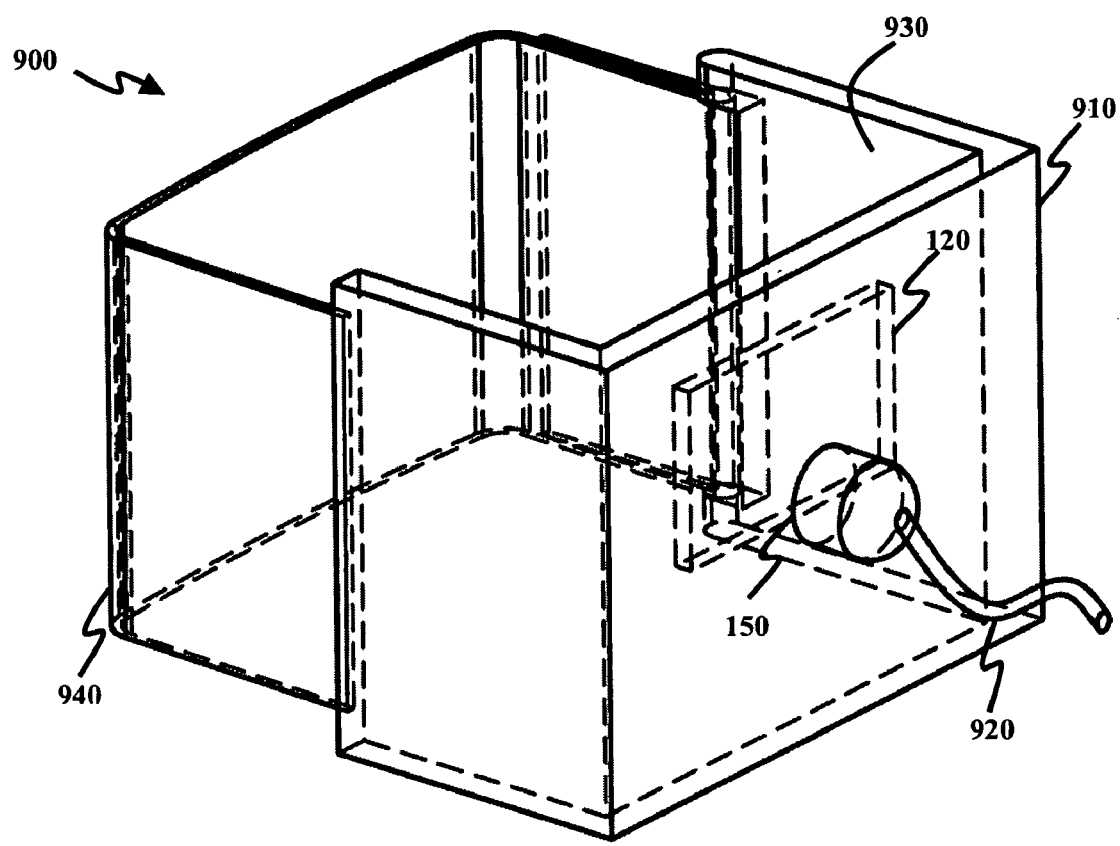
FIG. 9 illustrates an alternative embodiment of a simulator shaped for a rectangular telemetry device.

FIG. 9 illustrates an alternative embodiment of a simulator 900 that includes a restraining strap 940. The simulator 900 is typically a rectangular shaped body 910 together with a restraining strap 940. The rectangular shaped body 910 is typically manufactured from plastic suitable for a simulator device, but can alternatively be manufactured from other appropriate materials such as rubber, metal or fiberglass. The restraining strap 940 secures the simulator 900 firmly to rectangular shaped telemetry device such as a utility meter. Of course, the restraining strap 940 can alternatively be replaced by fastening mechanisms such as an elastic band, a hook-and-loop strap, an adhesive material or substance, magnetic or electromagnetic devices, or other means readily apparent to those of skill in the art.

The simulator antenna 120 is located on the inside face 930 of the plastic body 910 of the simulator 900. The RF connector 150 connects the simulator via a cable 920 to a deployment or diagnostic device, such as a CVU. The simulator 900 is typically open at the top to minimize physical constraints for utilizing the simulator 900 with a variety of utility meter models or other telemetry devices. The simulator 900 typically does not include positioning features that would interfere with the capability to utilize the simulator 900 on a wide variety of rectangular utility meters of a given size. Of course, the simulator 900 is also suitable for use with other telemetry devices.

Figure 10:
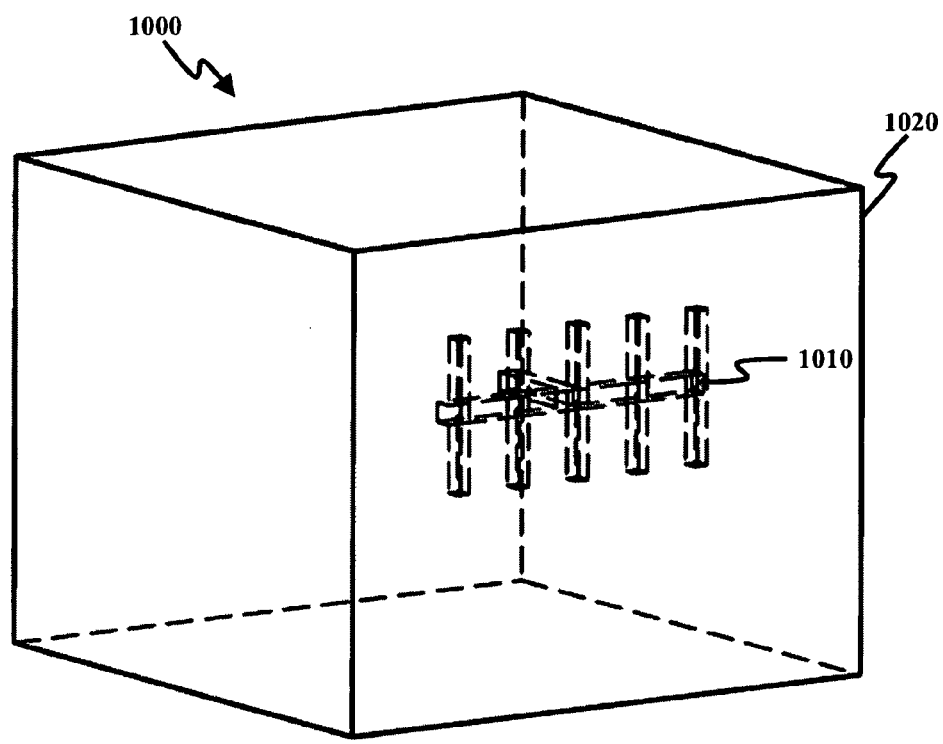
FIG. 10 illustrates a rectangular shaped telemetry device according to FIG. 9 having an internal antenna.

FIG. 10 illustrates a telemetry device 1000. The telemetry device 1000 is a rectangular shaped telemetry device and includes an internal antenna 1010, such as a dipole array antenna, on the inside face of the rectangular housing 1020. Of course, those of skill in the art will readily recognize that the internal antenna 1010 could be any type antenna that fits within the allotted space on the inside face of the rectangular housing. Additionally, the telemetry device 1000 is not confined to a rectangular shape, but may alternatively comprise any shape that is suitable for the particular telemetry device 1000.

Figure 11:
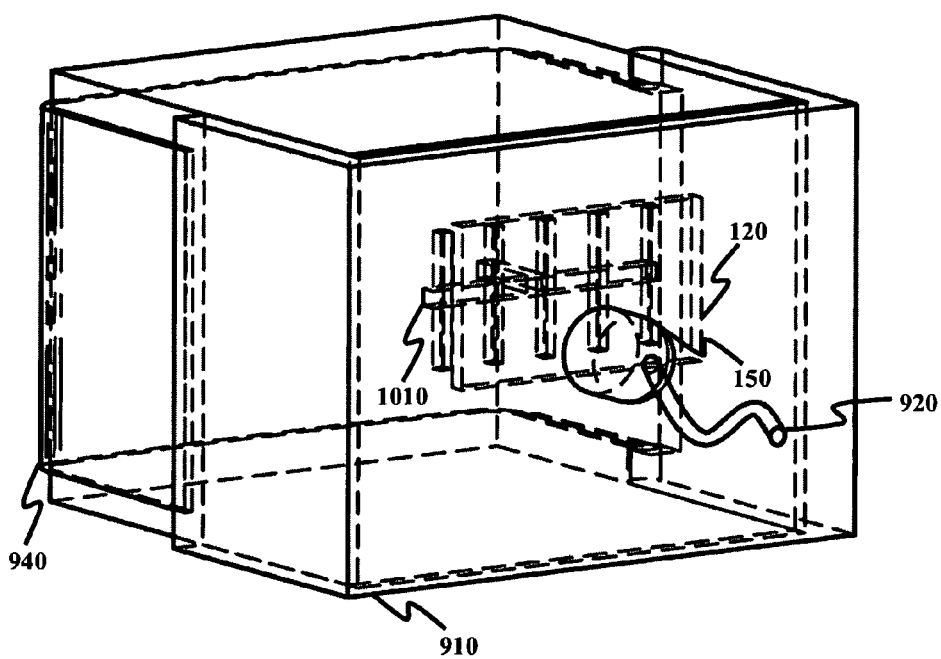
FIG. 11 illustrates an assembly of the simulator of FIG. 9 over the rectangular telemetry device of FIG. 10.

FIG. 11 illustrates an assembly of the simulator 900 over the telemetry device 1000. The simulator 900 receives a telemetry device 1000 that is capable of RF communication. The telemetry device housing 1020 encloses the necessary electronics for measuring and transmitting data using an available RF network. An internal telemetry antenna 1010 is located within the telemetry device housing 1020, and allows for wireless communication by the electronics of the telemetry device 1000.

It should be noted that the simulator 900 is not limited to a particular telemetry device 1000, but rather can be utilized for multiple telemetry devices 1000 of varying shapes. The simulator 900 is capable of accepting telemetry devices 1000 having multiple designs and configurations. The simulator 900 is installed over the telemetry device 1000 such that the simulator antenna 120 is of the same orientation as the internal telemetry antenna 1010 within the housing 1020 of the telemetry device 1000.

The antenna simulator 900 is secured firmly to the telemetry device housing 1020 via the restraining strap 940, so that the simulator antenna 120 is positioned as close as practically possible to the internal telemetry antenna 1010 of the telemetry device 1000 under test.

Figure 12:
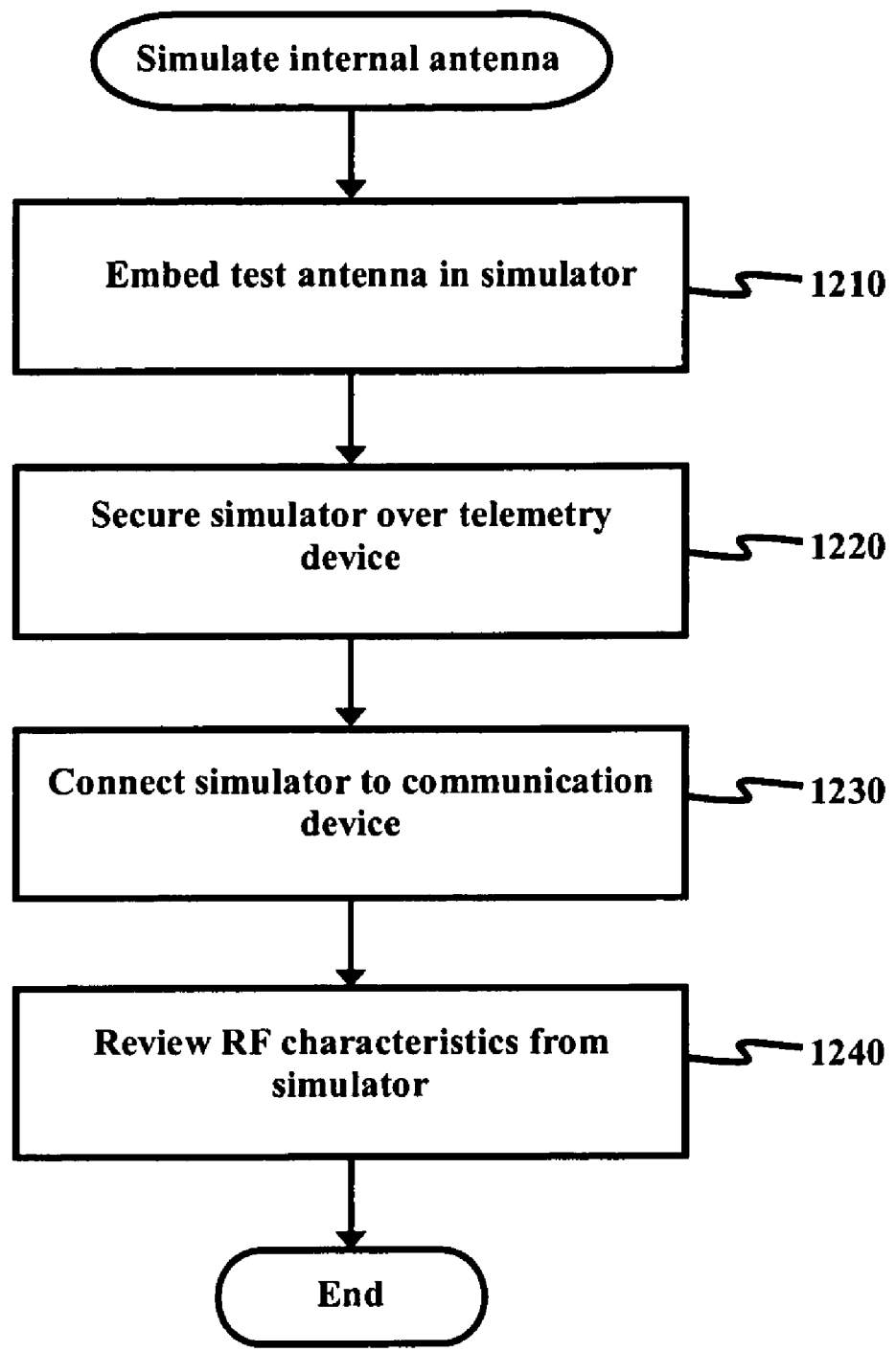
FIG. 12 is a flow diagram of a process for simulating an antenna inside a telemetry device in accordance with the present invention.

FIG. 12 is a flow diagram for simulating an antenna inside a telemetry device utilizing a simulator in accordance with the present inventions. At step 1210, a test antenna is located within a simulator. The test antenna is typically embedded on an inside face of the housing of the simulator device.

At step 1220, the simulator is secured to a telemetry device, such as a utility meter for example. The simulator is typically fastened in a manner that firmly secures the simulator to the telemetry device so that the test antenna is positioned as near as practically possible to the internal antenna of the telemetry device.

The simulator is connected to a communication device at step 1230. The communication device is typically a deployment or diagnostic device, such as a CVU for example.

At step 1240, the simulator is utilized to gather simulation or test information from the test antenna so that the expected performance of the telemetry device can be assessed. Typically, wireless signals can be acquired and analyzed for determination of three wireless conditions. The resulting information is typically utilized to determine that the location either (1) has wireless coverage sufficient to support the telemetry device, (2) requires an external antenna having higher sensitivity, or (3) cannot support a telemetry device.

The simulation or test information is also useful during the development of telemetry devices. Parameters can be determined for the telemetry device, such as for example, ideal antenna position, shielding requirements, and antenna suitability for the desired function, among others.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A simulator device for simulating an internal antenna of a telemetry device to simulate and assess expected radio frequency (RF) characteristics of the telemetry device, the simulator device comprising:
 a simulator housing configured to accommodate close proximity placement of the telemetry device, the simulator housing comprising a structural shape corresponding to a telemetry housing of the telemetry device, the simulator housing including an opening for receiving the telemetry housing within the simulator housing;
 a simulator antenna within the simulator housing, wherein the simulator antenna corresponds to a potential location for an internal antenna within the telemetry housing of the telemetry device;
 a radio frequency (RF) connector coupled to the simulator housing, wherein the RF connector is configured for connection to a communication device; and
 a fastening mechanism to secure the simulator device over the telemetry device such that the simulator antenna is adjacent to the potential location for the internal antenna,
wherein proximity of the simulator antenna to the potential location for the internal antenna provides simulator device RF characteristics that simulate internal antenna RF characteristics.

2. The simulator device of claim 1, wherein the RF connector is configured for connection to a deployment device.

3. The simulator device of claim 1, wherein the RF connector is configured for connection to a diagnostic device.

4. The simulator device of claim 1, wherein the RF connector is configured for connection to a coverage validation unit (CVU).

5. The simulator device of claim 1, wherein the RF connector is coupled to the simulator device via a cable.

6. The simulator device of claim 1, wherein the telemetry device is a utility meter.

7. The simulator device of claim 1, wherein the telemetry device includes an internal antenna.

8. The simulator device of claim 1, wherein the simulator housing is comprised of the same material as the telemetry housing.

9. The simulator device of claim 1, wherein the structural shape of the simulator housing comprises a semicircle.

10. The simulator device of claim 1, wherein the fastening mechanism comprises a hook-and-loop strap.

11. The simulator device of claim 1, wherein the fastening mechanism comprises an elastic band.

12. The simulator device of claim 1, wherein the fastening mechanism comprises an adhesive material or substance.

13. The simulator device of claim 1, wherein the fastening mechanism comprises a device configured to utilize a magnetic field.

14. The simulator device of claim 1, wherein the simulator housing comprises a top side opposite from the opening, wherein the top side is shaped to correspond to at least a portion of the telemetry housing of the telemetry device.

15. The simulator device of claim 14, wherein the top side further comprises at least one notch, the at least one notch corresponding to projections of the telemetry device, wherein each notch is configured to receive a corresponding projection.

16. The simulator device of claim 1, wherein the simulator housing fits over the telemetry housing such that the simulator antenna has an orientation corresponding to the potential location for the internal antenna.

17. The simulator device of claim 1, wherein the fastening mechanism comprises a slit in the simulator housing, the slit oriented such that the simulator device is secured to the telemetry device via a spring action.

18. The simulator device of claim 14, further comprising an inner-diameter lip on the top side, wherein the lip is oriented to facilitate placement of the simulator housing over the telemetry housing.

19. The simulator device of claim 1, wherein the simulator housing comprises an inner surface such that the simulator antenna is positioned on the inner surface.

20. The simulator device of claim 1, wherein the simulator housing is cylindrical in shape.

21. The simulator device of claim 20, wherein the simulator antenna comprises a curvature similar to the simulator housing.

22. The simulator device of claim 1, wherein the simulator housing is rectangular in shape.

23. The simulator device of claim 1, wherein the simulator housing has a shape that corresponds to a plurality of telemetry devices, wherein at least two telemetry devices from among the plurality of telemetry devices have telemetry housings of different shape.

24. The simulator device of claim 1, wherein the simulator housing comprises a plastic body.

25. The simulator device of claim 1, wherein the simulator housing comprises a rubber body.

26. The simulator device of claim 1, wherein the simulator housing comprises a metal body.

27. The simulator device of claim 1, wherein the simulator housing comprises a fiberglass body.

28. The simulator device of claim 7, wherein the simulator antenna is identical to the internal antenna of the telemetry device.

* * * * *

UNITED STATES PATENT AND TRADEMARK OFFICE
CERTIFICATE OF CORRECTION

PATENT NO.         : 7,994,990 B2                                   Page 1 of 1
APPLICATION NO.    : 12/138070
DATED              : August 9, 2011
INVENTOR(S)        : Paul Stoufer et al.

It is certified that error appears in the above-identified patent and that said Letters Patent is hereby corrected as shown below:

<u>On the Face of the Letters Patent</u>:

Please delete the name of the Assignee:

"~~SmartSynch, Inc., Jackson, MI (US)~~".

Please add the name of the Assignee:

--<u>SmartSynch, Inc., Jackson, MS (US)</u>--.

Signed and Sealed this

Eighth Day of November, 2011

David J. Kappos
*Director of the United States Patent and Trademark Office*